Figure 1:
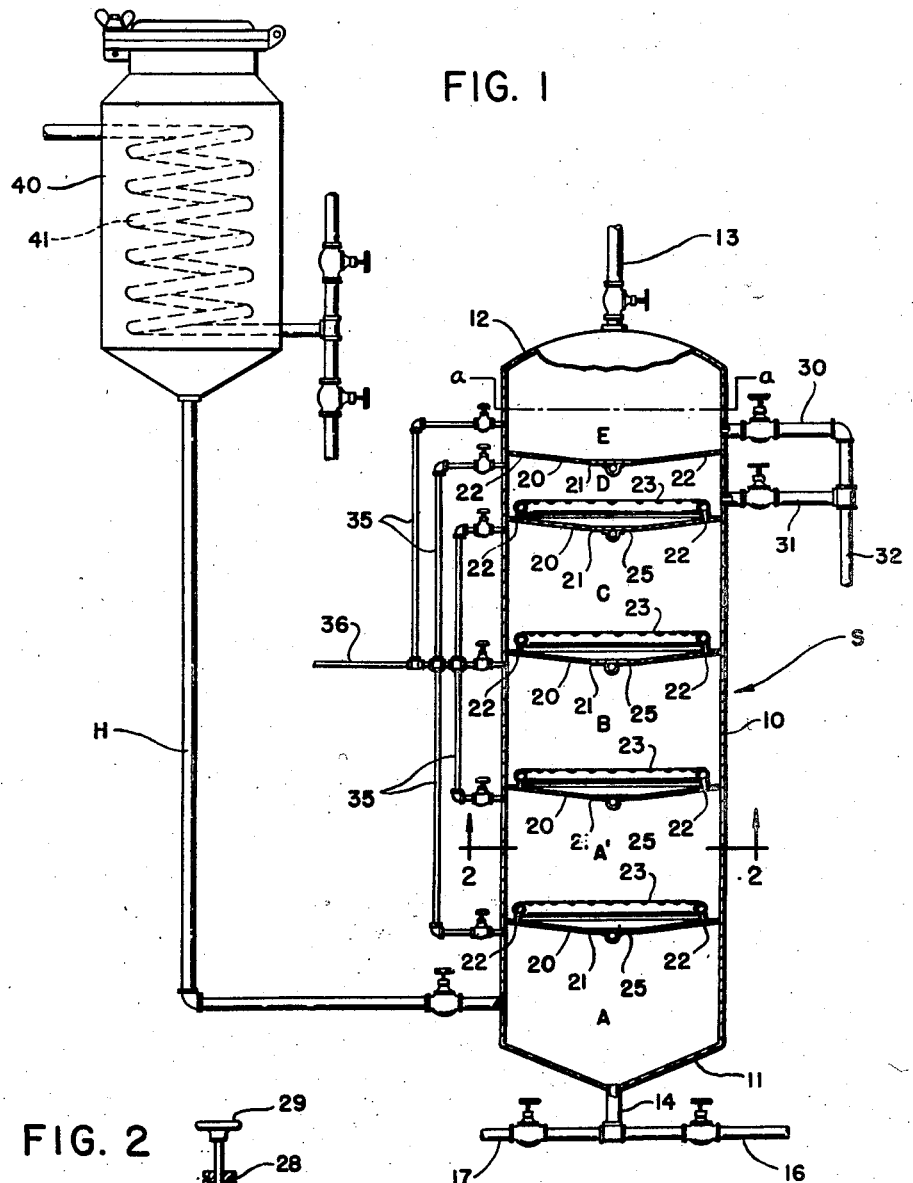

Sept. 28, 1948.  F. ALZOLA VICTORERO  2,450,218
APPARATUS FOR CONTINUOUS FERMENTATION
Filed Sept. 5, 1946

FRANCISCO ALZOLA VICTORERO
INVENTOR.

BY

Patented Sept. 28, 1948

2,450,218

UNITED STATES PATENT OFFICE 2,450,218

APPARATUS FOR CONTINUOUS FERMENTATION

Francisco Alzola Victorero, Cardenas, Cuba

Application September 5, 1946, Serial No. 694,990
In Cuba December 21, 1945

4 Claims. (Cl. 195—144)

This invention relates to improvements in the art of fermenting mashes or beers which evolve gas during the normal fermentation procedure; and is particularly of value in the alcoholic fermentation of worts including liquids obtained from cereals, grains or molasses as the raw material.

Taking the fermentation of blackstrap molasses mash as an instance, it is well known that in present methods of fermentation an important factor is the percentage of sugars in the mesh at the moment of seeding, for the reason that a great number of cells per milliliter are necessary for proper seeding, and, in practice, it is not possible to attain a desirable high cell concentration at will, whereas a specific amount of yeast is necessary for inoculating the fermenters. In the blackstrap mash, for example, the seed is withdrawn from one batch and delivered into another when the yeast has exhausted two-thirds of the fermentable sugars in the old batch; whereupon the time for acclimating in the fresh mash usually gives rise to a loss of time computed against the theoretical rate of operation of specified equipment. The use of third generation cultures increases this drawback. Present-day culture equipment requires the employment of long-trained technical personnel and careful and perfect work at the time of manipulation. As the fermenting devices are usually provided with a multiplicity of valves, the necessary daily manipulation is complex, and erroneous handling may lead to infection within the fermenting tank, or to the drawing down of the tank before the scheduled end point has been reached. Further, the necessary chemical, bacteriological and temperature controls necessary at many points in the plant requires strenuous labor to assure proper regularity in operation.

Those expert in the art are aware of the existence of certain fermentation systems, improperly called continuous, in which a primary or main fermenting tank is partly discharged to a "final fermentation tank" and is then re-supplied itself with fresh wort while the fermentation of the discharged wort continues in the final tank. A difficulty with these systems is that the primary fermentation is usually driven at very high velocity, with fermentation in seven to ten hour cycles in the primary vat and with use of up to 500,000,000 (five hundred million) cells per ml. This high through-put is accomplished at a sacrifice of theoretical efficiency in conversion of carbohydrate to alcohol. These processes have been found of little or no practical value for large-scale industrial application due to the ease with which they may become infected and the rapid increase of infective matter when present; and because they lack means for varying or controlling the volume of mash at different stages of fermentation, along with other technical defects which are recognized in the art.

In accordance with the present invention, the fermentation is conducted in a series of successive fermentation zones, these zones being superimposed on one another and with provision of a regulated upward movement of the fermented mash from zone to zone, by which the hydrostatic pressure at the bottom is effective to maintain a large part of the generated gas in solution in the lowermost and most active zone; consequently the gas tends to evolve as the fermenting wort moves upwardly from zone to zone and circulates within each particular zone; and thus it has been found feasible to conduct the final stages of fermentation under conditions of much higher gas evolution than has previously been feasible. In addition, a feature of the present invention is that of collecting the gas which evolves in a lower zone and then employing this gas by upward bubbling through a higher zone for producing agitation in the latter; this arrangement being feasible by reason of the superimposed or successive-level relationships of the zones from a lower zone which receives the fresh wort to an upper zone at which the fermented wort is discharged for distillation.

In the preferred embodiment of the invention an apparatus is utilized having a fermenting vessel of sufficient height to establish the desired hydrostatic pressure at its bottom, and provided with a number of substantially horizontal partitions dividing the fermenting vessel into a number of compartments, each providing one of the aforesaid superimposed fermentation zones. These partitions in the preferred form have apertures through which the forward movement of the fermenting wort can occur from zone to zone; together with regulatable valve means for controlling the cross-sections of passage at the apertures and thereby determining the rate of flow from zone to zone and controlling the duration of fermentation within each particular zone.

A further advantage of the instant procedure and apparatus lies in the fact that infective bacteria are lighter than the beers, and hence the present procedure and apparatus, in which successive upward movement is permitted, results in the quick passage of bacteria to the top of the total apparatus, while the agitation within each zone acts to maintain the beer and yeast in changing and intermingled relationship for accomplishing rapid fermentation.

Figure 2:
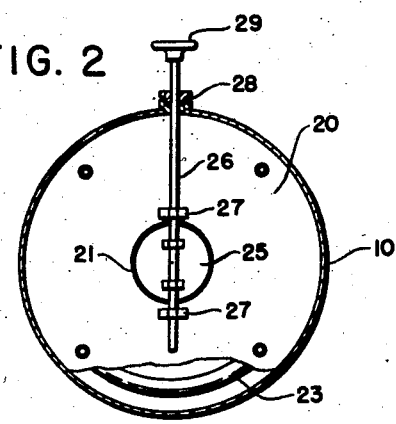

An illustrative form of apparatus is set out on the accompanying drawings in which:

Fig. 1 is an upright diagrammatic sectional view through apparatus comprising a supply vessel, a fermentation vessel, and associated conduits and Fig. 2 is a horizontal section, on larger scale, substantially on line 2—2 of Fig. 1, and showing a partition with its regulating valve.

The illustrated apparatus has a fermentation vessel S which has a total liquids height along its upright wall 10 from the conical bottom 11 to the top liquid level $a$—$a$ adequate to provide a hydrostatic pressure at the bottom for maintaining a substantial part of the fermentatively-produced carbon dioxide in solution at the bottom of the vessel. The upper closed end 12 is domed and is connected to the escape pipe 13 for carbon dioxide, this pipe being valved and connected for example to carbon dioxide washers (not shown) effective to condense and recover the alcohol passing off through this pipe. The conical lower end 11 leads to the drain pipe 14, and this in turn has valved communications to a pipe 16 leading to the distilling column (not shown) and to a pipe 17 leading to a waste discharge.

The interior of the vessel 10 is divided into a number of superimposed fermentation chambers by the partitions 20 which are of conical form with the apex downward and each having a central aperture 21. The conical partitions thus provide deflectors for guiding the ascending carbon dioxide gas in the respective compartment toward the vertical wall 10 of vessel S. In vertical section, the slope of the conical wall must be sufficient to allow the deflection of the gas and provide an annular inverted pocket or trap at openings 22: five degrees has been utilized in a plant. Adjacent the wall 10, each partition has apertures 22 which permit this gas to escape upwardly out of the inverted trough formed by the partition 20 and the wall 10. In the preferred form, these apertures 22 for all but the top partition lead into short pipe nipples connected to the ring pipes 23 in the lower part of the next-higher compartment; these ring pipes 23 having a large number of holes through which the gas escapes into the compartment and thus causes agitation within this higher compartment.

The central aperture 21 of each partition can be substantially closed, when desired, by a valve illustrated as a rotatable damper plate 25 fixed on a shaft 26 which is supported by the bearing eyes 27 adjacent the aperture; and which extends through a tight packing gland 28 in the wall 10 and carries a handle 29 on the exterior thereof so that the position of the damper plate 25 may be controlled. In practice, friction in the packing gland 28 holds the shaft and damper plate in adjusted position.

These partitions 20 divide the vessel 3, into a succession of compartments which are designated as A, A', B, C, D and E from bottom to top.

The compartments D and E, at low liquid levels therein, are connected through valved pipes 30, 31 to the conduit 32 leading to a distilling column (not shown).

Each compartment is preferably connected below its liquid level by a valved sampling pipe 35 with a sampling manifold 36 from which samples of the vessel contents can be drawn off.

A preparation tank 40 is shown illustratively for receiving the raw mash and nutrient, etc. This tank has the heating and cooling coil 41; and the valved supply line H leading to the lower compartment A of the fermentation vessel S.

Assuming that a molasses mash is to be fermented to ethanol, a measured quantity of blackstrap molasses is delivered into the preparing vessel 40 while the discharge pipe H is closed. This molasses is diluted, adjusted in density (Brix) and in acidity, inversion effected, nutrients added, etc. in any desired way. Such preparation of a wort or mash is well known, and no claim is made thereto broadly.

If desired, the mash may be sterilized, but this is unnecessary particularly with a fermentation vessel S having a height of, say, 30 feet or more, when employed on molasses mash which has been initially adjusted to an acidity of around pH 3.50, for the reason that a sufficient and adequate part of the carbon dioxide formed by fermentation is held in solution in the lower zones so that a high acidity is maintained and foreign or contaminating organisms are inhibited or destroyed.

When this mash has been established in a desired condition of concentration and acidity, the valve in pipe H is opened and the mash is permitted to flow into the fermenting vessel S, entering the lowermost compartment A thereof. In practice, it has been found that, with the saccharomyces yeasts employed in the ethanol fermentation, the mash may advantageously have the acidity of pH 3.50. During the initial starting, the seeding yeast may be added in the preparation vessel 40 or it may be directly introduced in the fermentation vessel S, in which latter event it is of course necessary to assure that the yeast is present in the lower compartment A when the mash enters through pipe H.

In practice, it has been found desirable to conduct fermentation in the lower compartment or zone A until the molasses mash has had approximately two-thirds of its sugar content fermented. This action is controlled by regulating the inflow of fresh mash through pipe H, and by regulating the valve 25 in the partition 20 above the chamber A. A gradual upward progression of the mash occurs so that it is exposed to further fermentation within the successive chambers A', B, C, D and E, with a duration of fermentation in each of these chambers which is in part controlled by adjustment of the partition valves above and below such compartment. In this way, by observing the density, sugar content, acidity, etc. in the successive compartments or zones of fermentation, and appropriately adjusting the rate of supply through the pipe H, and the flow at each valve 25, the fermentation of the remaining one-third of the total sugars in the fresh mash can be effected under controlled and accurately determined conditions.

In practice, it has been found desirable to have the height of the apparatus at least three times the diameter. In one practical example, the height was three meters and the diameter one meter, with the resulting capacity around 2844 liters, and the flow through pipe H was adjusted to permit this volume to flow every 24 hours. In practice, the height of the fermentation vessel S from the top liquid level down to the point of communication with the influx pipe H, and to the bottom of the effective fermentation zones, can be set at heights from, say, 8 to 40 feet hence the hydrostatic head may be as high as around 20 to 25 pounds at the bottom. Thus, the desired relatively acid condition of the mash is maintained by dissolved carbon dioxide, so that the acidity in the lowermost zones will be within the bracket of substantially pH 3 to pH 3.50. The desired capacity of the apparatus can be attained by changing the diameter and hence the cross sectional area: but as pointed out above, the diameter should preferably not exceed one-third of the height. When the height is 9 meters (about 30 feet), the diameter may be around 3 meters (10 feet); and thus it will be noted that apparatus of large size can be effectively made and operated in accordance with this invention.

When the fermented wort enters the upper compartments D and E, it is permitted to flow off from pipes 30 or 31 and thus is passed to the distilling column where it is fractionally separated and possibly rectified, in the usual ways.

As the mash ferments, the density decreases: and it will be noted that the fresh or densest mash is located at the bottom compartment of the fermentation vessel S and that the thinnest or most thoroughly fermented mash is in the uppermost compartment. Hence, the upward movement of the mash by reason of change of relative density is in the same direction as the upward flow induced by the supply from pipe H, and little tendency exists for mash to move downward from one compartment to another. However, with bottom-fermentation yeasts, the normal rate of flow past the valves 25 in an upward direction is not so rapid as to prevent a downward movement of the yeast cells: and in practice the heavy sediment of fermentation moves downwardly and collects in the conical end 11 and can be drawn off every two to four days.

The yeast in the lower compartment A is acclimated to the fresh wort, and thus there is essentially no lag phase; and correspondingly the yeast present in each of the other compartments is already in contact with a mash of closely the same density, acidity, and sugar content. Thus, there is a rapid fermentation during the forward movement of the wort from the point of fresh supply at pipe H to the point of passage to pipes 30 or 31.

Correspondingly, the maximum production of carbon dioxide occurs during the fermentation in the lower compartment or compartments A, A'. These compartments have the mash of the greatest density and are being subjected to the greatest hydrostatic pressure, hence more of the carbon dioxide is held in solution in these lower regions than can be held in solution at the lower density and lower hydrostatic pressure which exists in the upper regions. In each compartment, some carbon dioxide is evolved, is deflected by the overlying partition 20, enters the apertures 22 and bubbles upward into the next higher compartment to provoke a thorough agitation and circulation within these compartments, following which these gas bubbles tend to escape into the next higher compartment at a point adjacent the outer edge of the upper partition 20 thereof, so that the circulation within each compartment is essentially a downward movement of the beer along the vertical axis in Fig. 1, then a mixing of this descending beer with the mash entering from the next lower compartment, a radial outward movement toward the wall 10, and then an upward movement introduced by the gas-lift effect of the bubbling carbon dioxide, from which it will be noted that a circuitous path is established with thorough mixing of components. When the carbon dioxide attains the uppermost compartment E, it can be drawn off through the valved conduit 13. It will particularly be noted that by controlling the valves in pipes 13, 30, 31, a super-atmospheric pressure can be maintained within the apparatus, if so desired, to increase the apparent hydrostatic pressure in compartment A.

Upon taking samples through the pipe 35, and examining them bacteriologically, microscopically, and chemically, a quick control of infection, of cell-count per millimeter, and of the prevailing acidity, sugars and alcohol content, etc., can be effected at each stage, by varying the inflow material and by varying the rates of influx and efflux at the valves for the particular zone. Thus, if a number of cells in a sample from compartment B is too high, the quantity of nutrient in the inflowing mash at pipe H will be reduced, or even cut off for a quick reduction.

After the operation has proceeded for some hours, a condition of essential regularity becomes established, so that actual control operations are minor, and the fermenting agents, the sugars and the products of metabolism attain constant values in each zone of the fermentation and in the final chamber. If the selected ferment is found to have a tendency toward degeneration, the action in the lowermost zone may be varied by at times opening the upper valve so that compartments A, $A^1$ operate in effect as a single compartment, and consequently the ferment reaches a common steady state; and then partly closing the valve whereby parts of the ferment are subjected to a different environment, so that such alternative work at different sugars, etc., concentrations activates the organisms and prevents their degeneration. It will be noted that in such a sub-cycle the compartment A can operate as a pre-fermentation zone while the main fermentation is effected in compartment $A^1$.

In test runs with the plant described above, the equipment was kept in uninterrupted operation for several weeks, yielding daily a greater amount of spent mash or fermented beer than would have been its rated capacity as a batch vat. The handling is simplified, because the opportunity for infection is reduced, and static conditions can be produced and maintained at the successive zones.

In such runs, the following conditions were observed:

Mash entering through pipe H had 12% sugars concentration, approximately 17° Brix:

|  | °Brix |
|---|---|
| Compartment A | 10 |
| Compartment $A^1$ | 8.5 |
| Compartment B | 7.0 |
| Compartment C | 5.7 |
| Compartment D | 5.2 |
| Compartment E | 5.0 (to discharge) |

Temperature of fermentation was 36 degrees C. The yield was 89 percent of theoretical.

In the apparatus the successive valves 25 were smaller than the corresponding apertures in the partitions; so that they regulated the through-flow but did not prevent a continuous flow even at positions of maximum closure.

It is obvious that the invention is not restricted to the illustrative example, but may be utilized in many ways within the scope of the appended claims.

I claim:

1. A fermenting apparatus for gas-evolving worts, comprising a fermenting vessel, partitions dividing the vessel into a succession of superimposed fermentation compartments, each partition having an aperture for permitting restricted upward movement of wort from the inferior compartment to the superior compartment, conduits for supplying fresh wort to a lower compartment and for withdrawing fermented wort from an upper compartment and means on each partition spaced from the aperture for collecting evolved gas and discharging it in regulated amounts into the superior compartment.

2. A fermenting apparatus for gas-evolving worts, comprising a fermenting vessel, partitions dividing the vessel into a succession of superimposed fermentation compartments, each partition having an aperture for permitting restricted upward movement of wort from one compartment to a higher compartment, each partition sloping upwardly away from said aperture to collect gas evolving in the compartment there-beneath and having a second aperture spaced from and above the first aperture through which the collected gas passes to provoke agitation in the compartment above, and conduits for supplying fresh wort to a lower compartment and for withdrawing fermented wort from an upper compartment.

3. A fermenting apparatus for gas-evolving worts, comprising a fermenting vessel, partitions dividing the vessel into a succession of superimposed fermentation compartments, each partition having an aperture and a valve for controlling upward movement of wort through said aperture from the compartment below the partition to the compartment above the same, each partition sloping upwardly away from said aperture to collect gas evolving in the compartment there-beneath and having apertures above and spaced from said first named aperture through which the collected gas passes to provoke agitation in a higher compartment, and conduits for supplying fresh wort to a lower compartment and for withdrawing fermented wort from an upper compartment.

4. A fermenting apparatus for gas-evolving worts, comprising a fermenting vessel, slightly sloping partitions dividing the vessel into a succession of superimposed fermentation compartments, each partition having an aperture at its lowest point and a valve for controlling the passage of wort through said aperture for permitting restricted upward movement of wort from one compartment to a higher compartment, said valve being at its position of maximum closure leaving a restricted passage through the aperture, each partition collecting gas evolving in the compartment there-beneath and having apertures spaced from said first named aperture through which the collected gas passes to provoke agitation in the compartment thereabove, and conduits for supplying fresh wort to a lower compartment and for withdrawing fermented wort from an upper compartment.

FRANCISCO ALZOLA VICTORERO.

REFERENCES CITED

The following references are of record in the file of this patent:

UNITED STATES PATENTS

| Number | Name | Date |
|---|---|---|
| 765,794 | Moncrieff | July 26, 1904 |
| 2,146,326 | Bergius et al. | Feb. 7, 1939 |
| 2,371,208 | Alzola | Mar. 13, 1945 |